(12) United States Patent
Kruzick et al.

(10) Patent No.: US 6,186,563 B1
(45) Date of Patent: Feb. 13, 2001

(54) APPARATUS AND METHOD FOR REMOTELY LOCKING AND UNLOCKING A TRANSPORTABLE CONTAINER

(75) Inventors: Kent Kruzick, Winamac; Dann L. Bailey, Sr., Knox; Christopher P. Steinman, Rochester, all of IN (US)

(73) Assignee: Galbreath, Inc., Winamac, IN (US)

(*) Notice: Under 35 U.S.C. 154(b), the term of this patent shall be extended for 0 days.

(21) Appl. No.: 08/841,885

(22) Filed: May 5, 1997

Related U.S. Application Data

(63) Continuation of application No. 08/659,560, filed on Jun. 6, 1996, now abandoned, which is a continuation of application No. 08/417,139, filed on Apr. 4, 1995, now abandoned.

(51) Int. Cl.⁷ ........................................................ E05C 3/06
(52) U.S. Cl. .................... 292/201; 296/35.3; 296/184; 292/DIG. 29
(58) Field of Search .................. 292/1, 100, 201, 292/DIG. 29, 341.16; 298/23 R, 23 MD, 23 M, 23 S, 23 A, 23 B, 23 F, 23 D, 23 DF; 410/80–82; 296/184, 35.3, 56

(56) References Cited

U.S. PATENT DOCUMENTS

| | | | |
|---|---|---|---|
| 2,211,195 | * 8/1940 | Biszantz | 298/23 B |
| 2,261,745 | 11/1941 | Sand | 298/23 |
| 2,868,583 | 1/1959 | Harbers et al. | 298/15 |
| 2,876,038 | * 3/1959 | Ozanich | 298/23 |
| 2,943,753 | 7/1960 | Keys | 214/317 |
| 3,164,411 | * 1/1965 | Robinson | 298/23 B |
| 3,288,531 | * 11/1966 | Bartsch | 298/23 A |
| 3,379,475 | 4/1968 | Holland | 298/23 |
| 3,404,918 | 10/1968 | Lackey | 298/23 |
| 3,559,943 | * 2/1971 | Hammond | 410/82 |
| 3,811,729 | 5/1974 | Vornberger | 298/23 |
| 3,958,829 | * 5/1976 | Brown | 298/23 B |
| 4,068,769 | 1/1978 | Sweet et al. | 214/83.18 |
| 4,076,310 | 2/1978 | Schwalm | 298/23 |
| 4,163,425 | * 8/1979 | Bedard | 105/366 |
| 4,194,787 | 3/1980 | Williamsen | 298/23 |
| 4,339,148 | * 7/1982 | Smith et al. | 296/35.3 |
| 4,382,734 | * 5/1983 | Synowiec et al. | 410/70 |
| 4,966,275 | 10/1990 | Hallstrom, Jr. | 198/750 |
| 5,197,782 | * 3/1993 | May et al. | 298/23 |

* cited by examiner

Primary Examiner—B. Dayoan
Assistant Examiner—Gary Estremsky
(74) Attorney, Agent, or Firm—Woodard, Emhardt, Naughton, Moriarty & McNett

(57) ABSTRACT

An apparatus for remotely locking and unlocking a door on a transportable container, the container sized and configured to ride atop a vehicle, includes latch means mountable to the container for locking shut and unlocking the container door relative the container, linkage means mountable to the container, connected with the latch means and being for actuating the latch means, and drive means mountable to the vehicle and being for driving the linkage means, the drive means being operable remotely by a driver of the vehicle.

25 Claims, 10 Drawing Sheets

APPARATUS AND METHOD FOR REMOTELY LOCKING AND UNLOCKING A TRANSPORTABLE CONTAINER

This application is a continuation of application Ser. No. 08/659,560, filed Jun. 6, 1996, now abandoned, which is a continuation of Ser. No. 08/417,139 filed Apr. 4, 1995, now abandoned.

FIELD OF THE INVENTION

The present invention relates to the field of transportable containers, and more specifically, to an apparatus and method for remotely locking and unlocking a container adapted for transport upon one or more vehicles.

BACKGROUND OF THE INVENTION

Containers for bulk materials and other products come in numerous sizes and load capacities. Such containers are typically transported from one site to another by a motor vehicle or by railroad. In some cases, however, it is desirable to transport the container a part of the overall distance by railroad and part of the way by motor vehicle. Some of the containers adapted for transport in this manner are configured to carry bulk materials such as coal, stone and the like, and they will be equipped with a rear dump door. When the driver of the vehicle carrying the container arrives at the dumping destination, it is desirable for the driver to be able to both unlock the dump door and pivot the tilt frame of the vehicle, all from a remote location, i.e. the truck cab. This requires an interface between the dumping container and the truck cab enabling activation of a mechanism within the cab to unlock a mechanism at container dump door. Such interface must not inhibit or complicate the transport of the container on the railroad car or on the motor vehicle, nor should such interface inhibit or complicate the container dumping process. The mechanism should resist accidental unlocking and should enable the dump door to be remotely locked, as well. It is also desirable for the vehicle and railroad car to be able to hold the transportable container firmly in position during transport without interfering with the remote locking and container dumping functions.

What is needed is a container and vehicle assembly which provides for remote locking and unlocking of a dump door of a transportable container without inhibiting or complicating the transport or dumping processes.

SUMMARY OF THE INVENTION

A mechanism is provided for use with transport vehicles and a container that may be transported and/or dumped by a number of different vehicles whereby a door of the container may be locked and unlocked remotely.

Generally speaking there is provided an apparatus for remotely locking and unlocking a door on a transportable container, the container sized and configured to ride atop a vehicle. The apparatus includes a latch means mountable to the container for locking shut and unlocking the container door relative the container, linkage means mountable to the container, connected with the latch means and being for actuating the latch means, and drive means mountable to the vehicle and being for driving the linkage means, the drive means being operable remotely by a driver of the vehicle.

It is an object of the present invention is to provide an improved mechanism for locking and unlocking a door on a transportable container.

A further object of the present invention is to provide an improved mechanism for locking and unlocking a door on a transportable container that permits the container to be freely moved from one vehicle to another for transport and/or dumping.

Another object of the present invention is provide an improved mechanism for locking and unlocking a door on a transportable container which has a mechanism urging the door to stay in the locked condition once placed in the locked condition.

Further objects and advantages of the present invention will become apparent from the following description of the preferred embodiment.

DESCRIPTION OF THE PREFERRED EMBODIMENT

Figure 1:
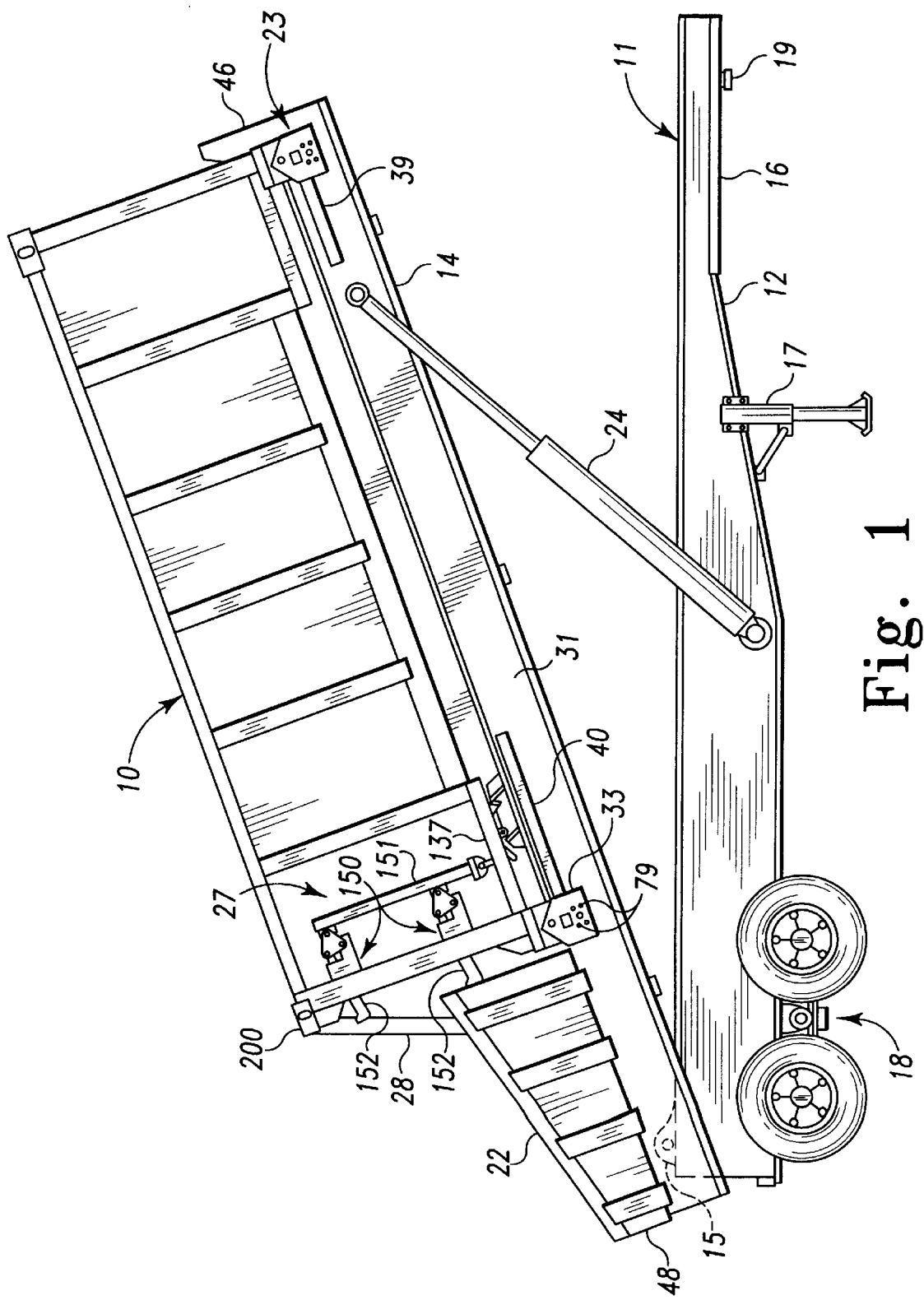
FIG. 1 is a side, elevational view of the apparatus for remotely locking and unlocking a door on a transportable container incorporated with a container and dump trailer in accordance with the present invention, and with the apparatus shown in the unlocked condition and the container dump door swung partially open.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Referring to FIG. 1, there is shown a transportable container 10 mounted atop a dump trailer 11 in accordance with the preferred embodiment of the present invention. Trailer 11 includes a trailer frame 12 and a tilt frame 14 pivotally mounted to frame 12 at rear hinges 15. The trailer frame of FIG. 1 is of conventional form with a tandem axle wheeled suspension unit 18 at its rearward end and a gooseneck 16 at its forward end. The gooseneck is provided with the usual king pin 19 for connection to a tandem axle tractor (not shown). Tilt frame 14 includes a chute 22 and four air activated hold down assemblies 23. Tilt frame 14 is pivoted about rear hinges 15 by a pair of hydraulic cylinders 24 (one shown) which are pivotally connected therebetween. A remotely operated locking mechanism 27 is shown in the unlocked position, thereby allowing a dump door 28 to pivot open as tilt frame 14 is pivoted about hinges 15.

Figure 2:
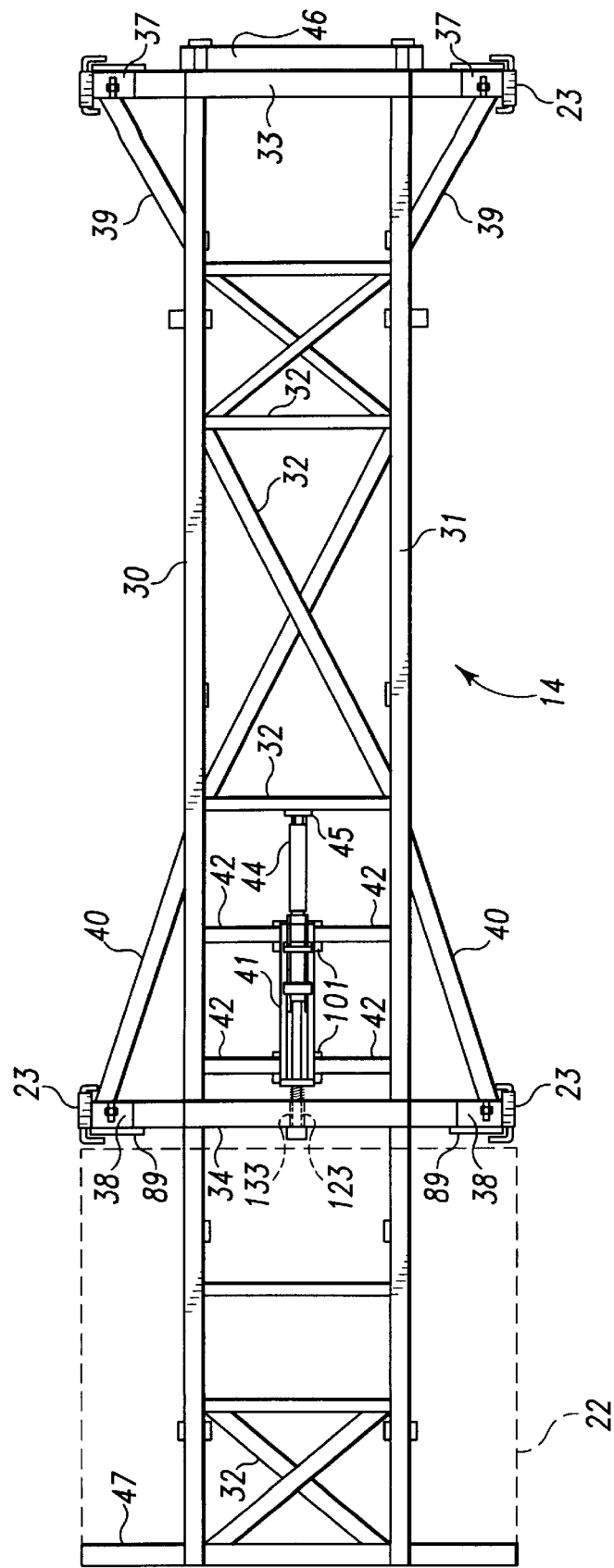
FIG. 2 is a plan view of the tilt frame 14 of the dump trailer of FIG. 1.

Referring to FIGS. 1 and 2, tilt frame 14 is constructed as a long, box-like weldment including a pair of laterally spaced, elongate sills 30 and 31 and a number of cross braces 32 which extend between and interconnect sills 30 and 31. Also spanning across and welded to sills 30 and 31 are front and rear cross sills 33 and 34. The outer ends 37 and 38 of cross sills 33 and 34, respectively, extend outwardly of sills 30 and 31 and are structurally supported by angle braces 39 and 40, as shown in FIG. 2. Four air activated hold down assemblies 23 are mounted, one each to the outer ends 37 and 38 of cross sills 33 and 34. A hydraulic actuator assembly 41 is rigidly mounted centrally to tilt frame 14 by two pair of mounting braces 42. Actuator assembly 41 also includes a double acting hydraulic cylinder 44 which is anchored at 45 to one of the cross braces 32. Tilt frame 14 further includes a front mounted container stop and guide member 46 that assists in aligning container 10 as it is lowered onto tilt frame 14. A rear cross sill 47 is rigidly connected to and extends across and outwardly of sills 30 and 31. As it is desirable to evenly distribute the weight of container 10 and its load equally between the trailer's and truck's wheel assemblies, container 10 is positioned somewhat forwardly of its rear 48. A chute 22 is therefore provided to guide the flow of bulk material as it exits the rear of container 10. Chute 22 is supported by and mounted to rear cross sill 47 and sills 30 and 31. As shown in FIG. 1 and in phantom in FIG. 2, chute 22 is made wide enough to permit dump door 28 to pivot outwardly from container 10 and permit the free flow of bulk materials exiting container 10 to the rear of trailer 12.

Figure 3:
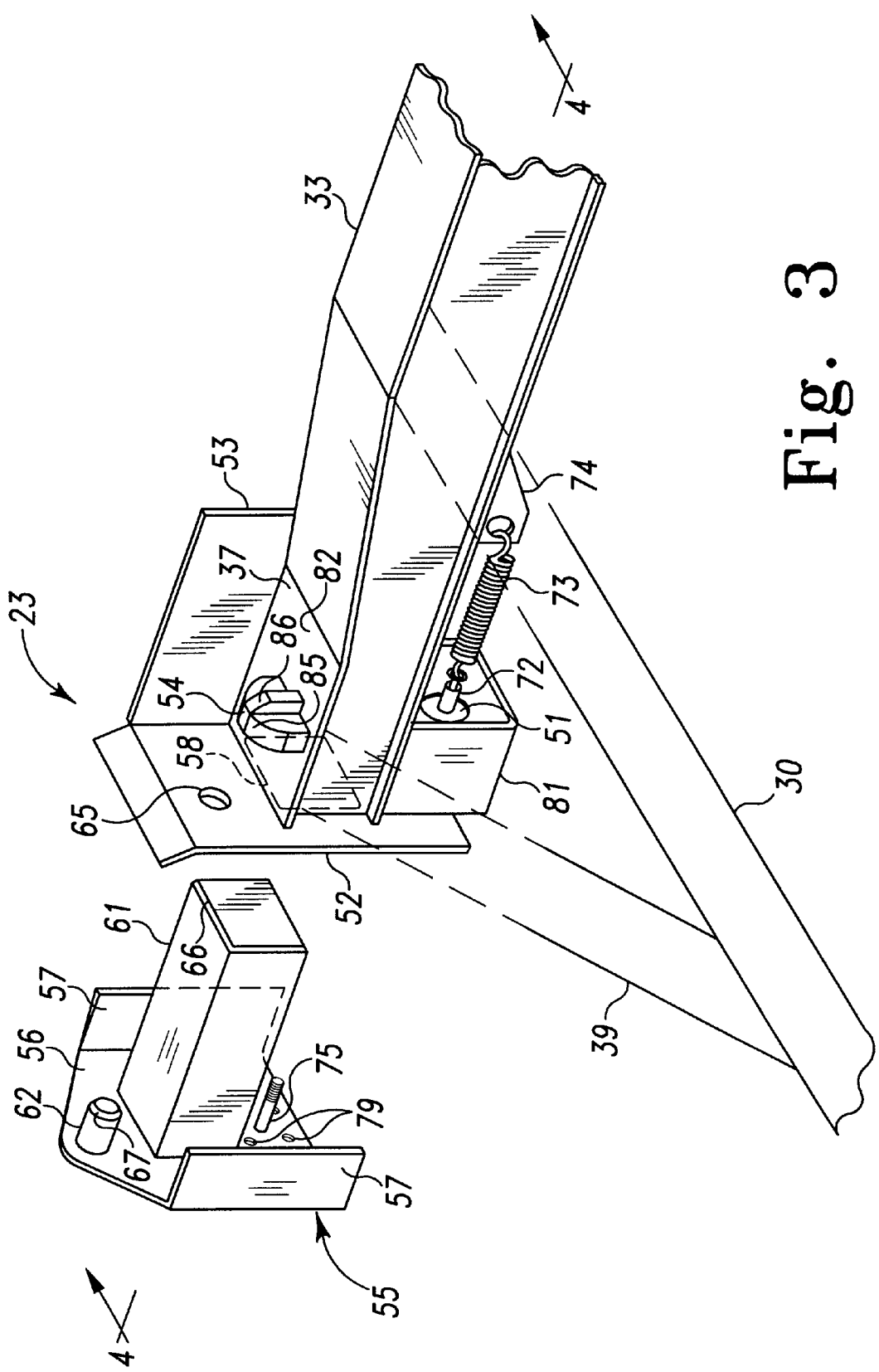
FIG. 3 is a perspective view of the forward left air-activated hold down assembly 23 of the tilt frame of FIG. 2 taken along the lines 4—4 and viewed in the direction of the arrows, and with the plug assembly 55 exploded away from the rest of assembly 23.
Figure 4:
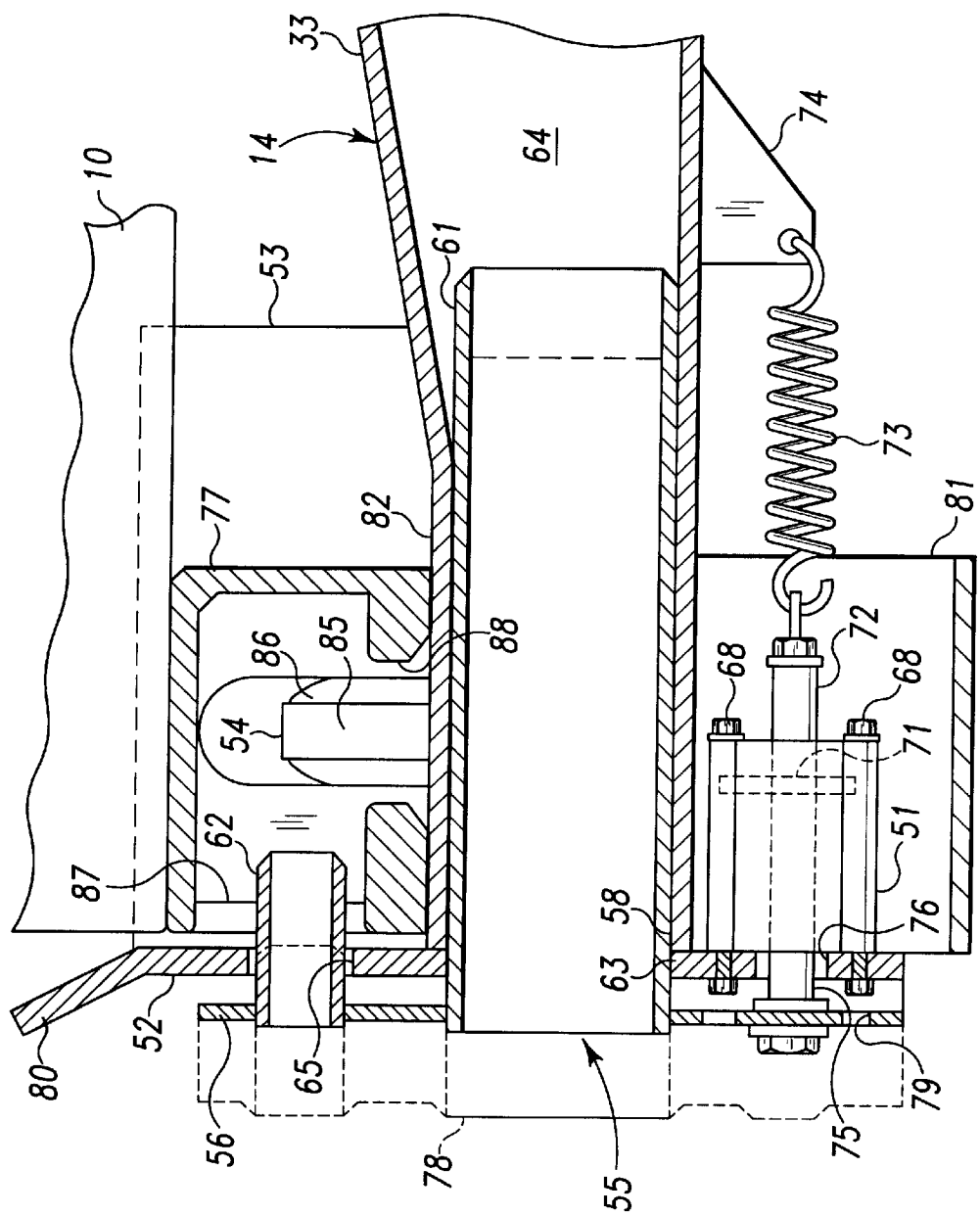
FIG. 4 is a side, cross-sectional view of the air activated hold down assembly 23 of FIG. 3 taken along the lines 4—4 and viewed in the direction of the arrows, and with a portion of container 10 shown locked in a transport position atop tilt frame 14.

Referring to FIGS. 2–4, there is shown the hold down assembly 23 that is mounted to the left outer end 37 of front cross sill 33. Hold down assembly 23 is shown exploded in FIG. 3 and is shown in a substantially locked condition in FIG. 4. Hold down assembly 23 includes a double acting air cylinder 51, a side guide plate 52, a front guide plate 53, a container locator 54 and a plug assembly 55. Plug assembly 55 includes a formed wall 56 and a pair of opposing side wall sections 57 extending orthogonally inwardly from opposing edges of formed wall 56. A rectangular cross-sectioned slide tube 61 extends inwardly from formed wall 56. A circular cross-sectioned locking plug 62 also extends inwardly from formed wall 56 above and slightly rearwardly relative to slide tube 61.

Cross sill 33 is hollow and defines a rectangular opening 58 at the outside of outer end 37. Side and front guide plates 52 and 53, respectively, are rigidly fixed to the outer side and front side of outer end 37, as shown in FIG. 3. Side plate 52 defines a substantially rectangular opening 63 which aligns with opening 58. Openings 58 and 63 and slide tube 61 are complementarily dimensioned to allow slide tube 61 to be received through openings 58 and 63 and into the hollow cavity 64 of cross sill 33, as shown in FIG. 4. Side plate 52 also defines a hole 65 above and slightly rearwardly of opening 58. Hole 65 is sized and aligned to receive plug 62 while openings 58 and 63 receive slide tube 61 into cavity 64 as shown. The leading ends of both slide tube 61 and locking plug 62 are chamfered at 66 and 67, respectively, to facilitate their entry into hole 65 and openings 58 and 63. Double acting air cylinder 51 is fixedly mounted to formed wall 56 just below cross sill 33 by four rectangularly spaced bolts 68 (two shown in FIG. 4). The piston 71 of air cylinder 51 is connected on one side to a rod 72. A spring 73 extends in tension between rod 72 and anchor clip 74, clip 74 being rigidly mounted to the underside of cross sill 33. A bolt 75 extends through an opening 76 in formed wall 56 and connects to the other side of piston 71 of air cylinder 51. Spring 73 acts to pull rod 72, piston 71, bolt 75 and thereby plug assembly 55 inwardly to a locked condition whereby plug 62 extends through hole 65 and into a cast corner block 77 of a container 10 seated thereabove. Activation of air cylinder 51 moves piston 71 outwardly which, against the bias of spring 73, moves plug assembly 55 to its outer and unlocked condition (shown in phantom at 78) whereby locking plug 62 is withdrawn from corner block 77. For clarity, plug assembly 55 is shown in FIG. 4 in substantially the locked condition. Plug assembly 55 may yet be activated a small distance to the right into the locked condition. Plug assembly 55 is provided with a set of four holes 79 which align with and provide clearance and access for the heads of bolts 68. The top of side guide plate 52 is angled outwardly at 80 to provide a guide for lowering container 10 down into its seated transport and dumping position (shown in FIGS. 1 and 4). A U-shaped housing 81 is fixed to the underside of cross sill 33 and protects air cylinder 51.

Outer end 37 of cross sill 33 defines a top surface 82 upon which rests container 10 at its corner block 77. Fixedly connected to and extending upwardly from surface 82 is container locator 54. Locator 54 has a large dimensioned arcuate nub portion 85 which lies substantially in a longitudinal plane, and has a small dimensioned arcuate nub portion 86 lying substantially orthogonal to nub portion 85. Each container 10 adapted for transport and dumping by trailer 11 includes a cast corner block 77 at each of its bottom four corners. (Hold down assemblies 23 are each substantially the same and the description herein of assembly 23 at the front left corner of tilt frame 14 is representative thereof. One notable exception, however, is that the hold-down assemblies 23 at the rear of tilt frame 14 (on outer ends 38 of cross sill 34) have rear guide plates 89 instead of front guide plates 53, again to help guide a container 10 down to the correct transport and dumping position on tilt frame 14.) Each block 77 includes at least side and bottom openings 87 and 88, respectively. Bottom opening 88 is sized to receive container locator 54 therein to restrain container 10 to no or a minimal amount of lateral and longitudinal movement while riding atop trailer 11. Likewise, side opening 87 is sized and configured as desired to receive locking plug 62 therein to restrain container 10 from any or minimal vertical movement. The arcuate sections of nub portions 85 and 86 facilitate guiding container 10 into position. In the event of failure of any of air cylinders 51 to hold plug assembly in a retracted locked condition, spring 73 biases plug assembly into the locked condition.

Referring now to FIGS. 2 and 5–7, hydraulic actuator assembly 41 comprises a guide channel 90, a slide yoke 93 and a double acting hydraulic cylinder 94. Guide channel 90 is comprised of a pair of C-beams 91 and 92 which are mirror images of each other. C-beam 91 has a vertical wall 95 and bottom and top walls 96 and 97. The lower surface of top wall 97 and the upper surface of bottom wall 96 are slanted at 98 as shown. C-beams 91 and 92 are rigidly connected with each other by bottom cross plates 100 and 101 and by end plate 102. End plate 102 defines a centrally located hole 103.

Figure 5:
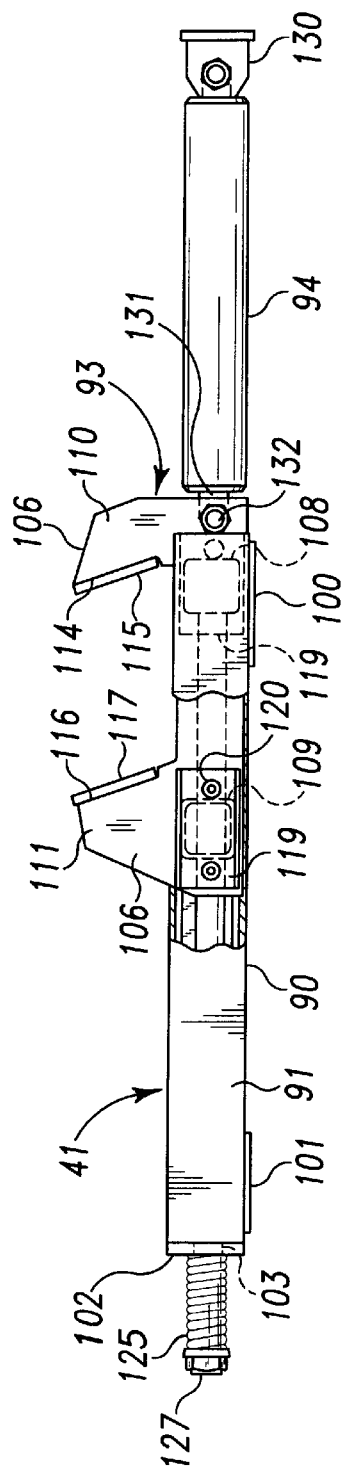
FIG. 5 is a side, elevational and partially cross-sectional view of the hydraulic actuator assembly 41 of tilt frame 14 of FIG. 2, and with slide yoke 93 shown in the fully retracted locking condition against the bias of spring 125.
Figure 6:
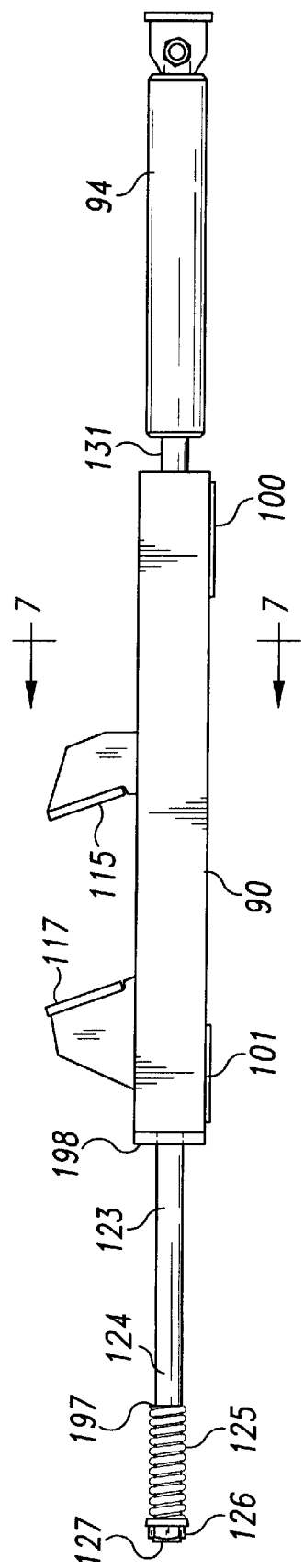
FIG. 6 is a side, elevational view of the hydraulic actuator assembly 41 of FIG. 5 shown with slide yoke 93 in the extended and unlocking condition.
Figure 7:
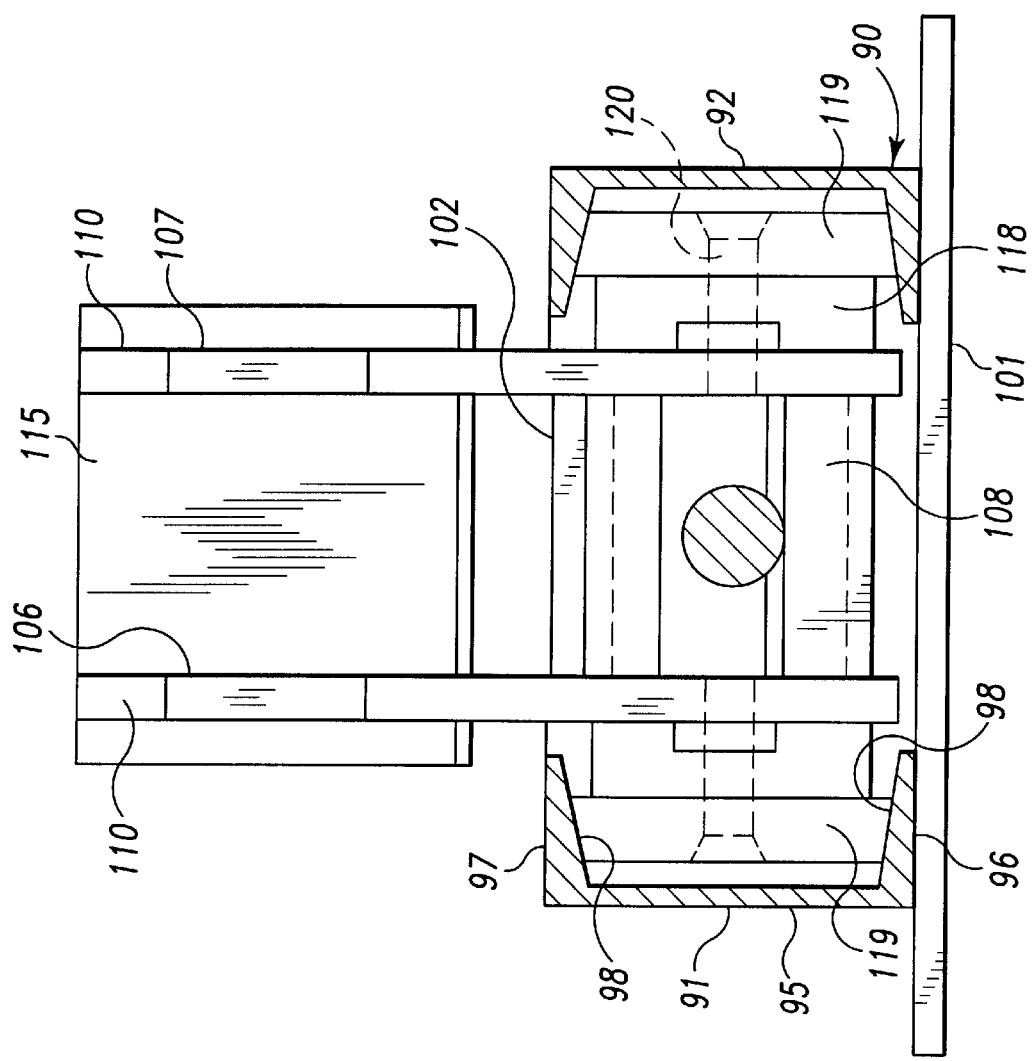
FIG 7 is an end cross-sectional view of the hydraulic actuator assembly 41 of FIG. 6 taken along the lines 7—7 and viewed in the direction of the arrows.
Figure 8:
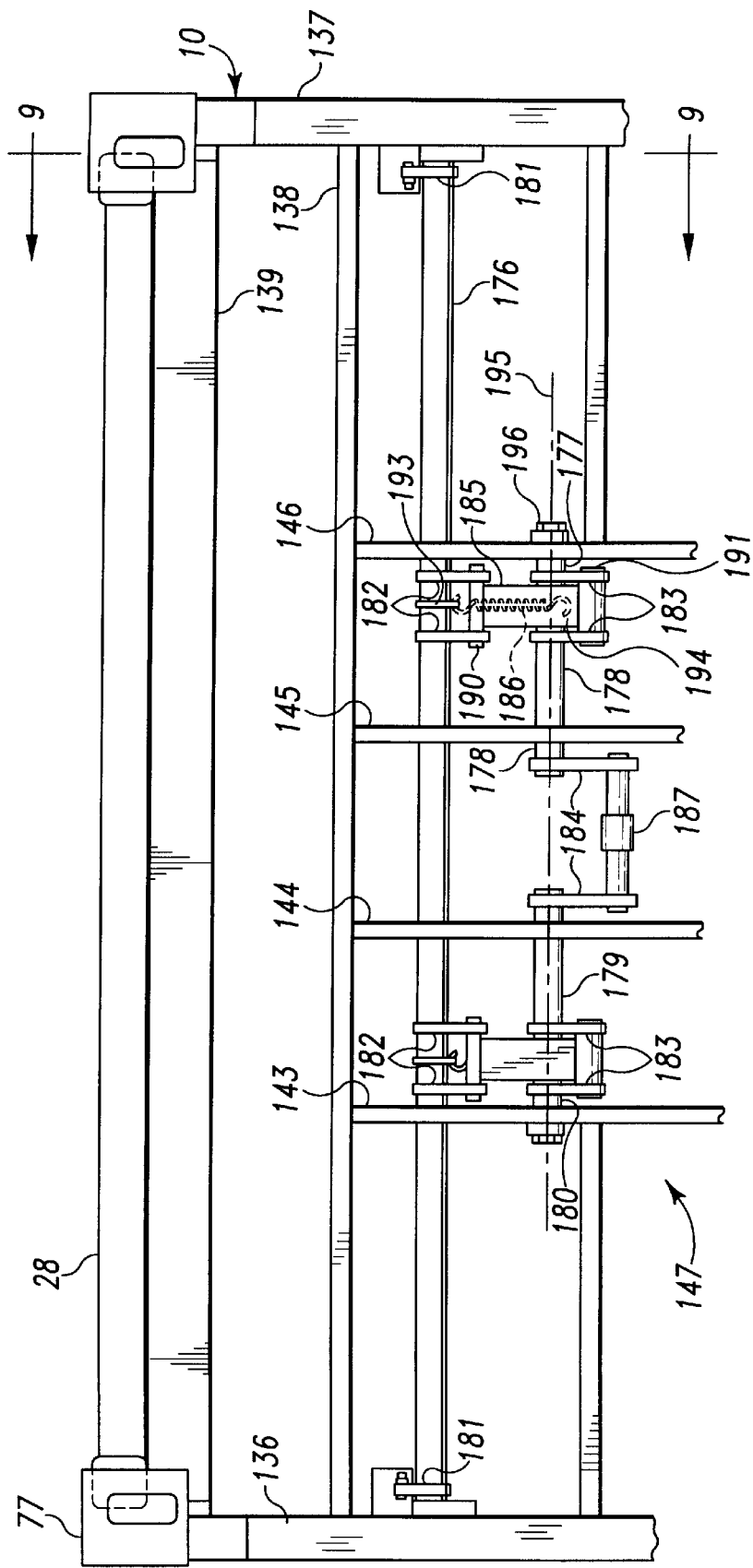
FIG. 8 is a bottom view of the rear of the container 10 of FIG. 1, and showing the linkage assembly 147 in the locking condition.

Slide yoke 93 includes a pair of identically shaped, parallel yoke frame members 106 and 107. Frame members 106 and 107 are formed plates which are rigidly held in a parallel relationship by fore and aft rectangular cross sectioned spacer tubes 108 and 109. Each frame member 106 and 107 also defines upwardly extending, fore and aft stanchions 110 and 111. Fore stanchion 110 of frame members 106 and 107 each define a rearwardly facing edge 114 that forms an angle with vertical of approximately 20°, as shown in FIG. 5. A generally rectangular shaped wear plate 115 is fixed to and across edges 114 of fore stanchions 110 of members 106 and 107 by conventional means, such as screws (not shown). Likewise, aft stanchions 111 of members 106 and 107 each define a forwardly facing edge 116 that also forms an angle with vertical of approximately 20°. A generally rectangular wear plate 117 is fixedly mounted to and across edges 116 by appropriate means such as screws (not shown). Wear plates 115 and 117 may be made of any appropriate durable material, such as steel. As shown in FIG. 5, both wear plates 115 and 117 slope upwardly rearwardly at an angle of approximately 20° with the vertical.

On the outside of each yoke frame member 106 and 107 are mounted a pair of spacers 118, and to the outside of each pair of spacers 118 are mounted a pair of wear strips 119. Spacers 118 and wear strips 119 are mounted to their respective frame members 106 and 107 by appropriate means such as screws 120. Wear strips 119 are sized to fit snugly within the angled inner surfaces 98 of bottom and top walls 96 and 97 of C-beams 91 and 92. Slide yoke 93 is thus permitted to slide forward and rearward in reciprocating fashion within guide channel 90.

Slide yoke 93 further includes a yoke positioning rod 123. Rod 123 is mounted to fore spacer tube 108 and extends therefrom through aft spacer tube 109 and extends therefrom rearwardly through hole 103 of end plate 102. Rod 123 is welded to both fore and aft spacer tubes 108 and 109 for rigid support. The outboard end 124 of rod 123 is fitted with a compression spring 125. A nut 126 or other appropriate stop means is firmly connected to the outer most end 127 of rod 123 to prevent spring 125 from moving off the end 127 of rod 123.

Double acting hydraulic cylinder 94 is anchored at one end 130 to a cross brace 32 (FIG. 2). The outboard end of the piston rod 131 of cylinder 94 is mounted to yoke frame members 106 and 107 by appropriate means such as a pin 132. Guide channel 90 is then firmly held in place by four mounting braces 42 that are welded to the outsides of guide channel 90 at their inner ends and to sills 30 and 31 at their outer ends, as shown in FIG. 2. Also, plates 100 and 101 extend outwardly of guide channel 90 to be mounted for additional support to the undersides of mounting braces 42 (FIG. 2). A hole 133 is provided in cross sill 34 to permit the reciprocating movement of yoke positioning rod 123 therethrough.

FIG. 5 shows hydraulic cylinder 94 completely retracted which pulls slide yoke 93 to its rear most position and against the bias of compression spring 125. The hydraulic circuit (not shown) connected with hydraulic cylinder 94 is configured so that upon release of the switch, lever or the like that activates the cylinder 94, cylinder 94 will be vented. As will be described herein, compression spring 125 will then pull slide yoke 93 several inches to the rear (to the left as shown in FIG. 5). In the extended position shown in FIG. 6, cylinder 94 has been activated to extend slide yoke 93 toward the rear of the trailer. In this case, yoke positioning rod 123 and its spring 125 offer no resistance to the movement of slide yoke 93.

Referring now to FIGS. 1, 8–11, transportable container 10 generally includes a welded skeleton of rectangular cross-sectioned tubing with steel panels welded thereto. Door 28 is mounted at the rear of container 10 by hinges (not shown) at the top edge thereof to permit the door to swing rearwardly open as shown in FIG. 1. Included in the container skeleton are lower, longitudinal rectangular cross-sectioned tubing members 136 and 137. Extending between members 136 and 137 is a C-beam 138 and additional rectangular cross-section tubing members 139 and 140. Extending longitudinally between beams 138 and 140 are four linkage assembly mounting beams 143–146. Container 10 further includes latching mechanism 27 and linkage assembly 147. Latching mechanism 27 will now be described.

Figure 9:
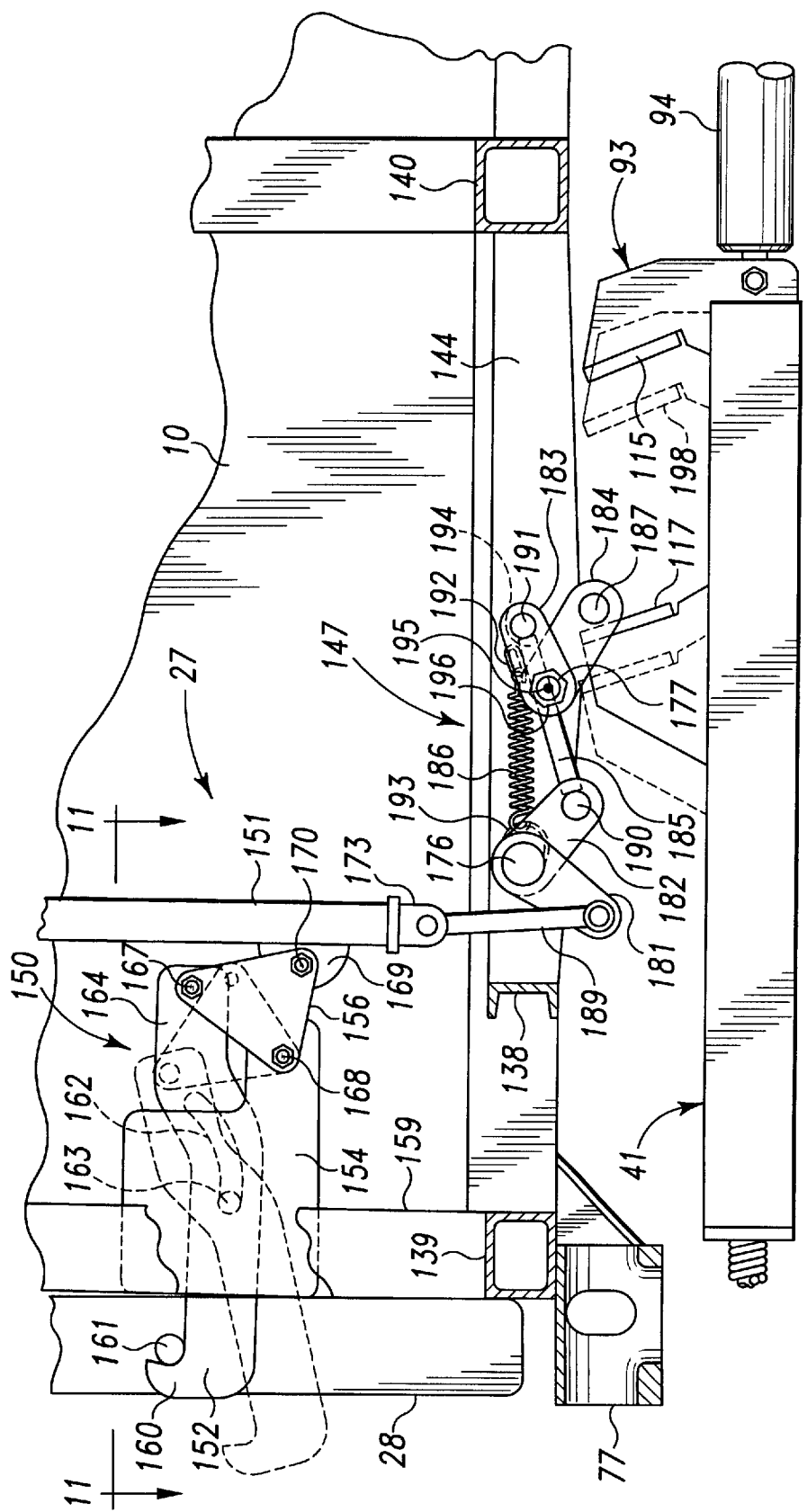
FIG. 9 is a side, elevational and partially cross-sectional view of the container 10 of FIG. 8 taken along the lines 9—9 and viewed in the direction of the arrows, and including hydraulic actuator assembly 41 operably juxtaposed therebelow with portions thereof broken away for clarity, and with latch mechanism 27 and linkage assembly 147 shown in the locked condition.

Latching mechanism 27 includes two pairs of latch assemblies 150, one pair on each side of container 10. In each pair, there is an upper latch assembly and a lower latch assembly, the two being interconnected and driven by a vertical link 151. Each latch assembly 150 includes a latch 152, a pair of latch side plates 153 and 154 and a pair of bell cranks 155 and 156. Side plates 153 and 154 extend in parallel through an opening 157 in, and are fixed as by welding to, vertical frame member 159 of container 10. Latch 152 is shaped as shown in FIG. 9 and extends between side plates 153 and 154. The outboard end 160 of latch 152 is curved upwardly into a hook to engage with a corresponding, outwardly extending pin 161 of door 28. Latch 152 further defines an arcuate slot 162 through which extends a follower pin 163, pin 163 being held by and between side plates 153 and 154. The inboard end 164 of latch 152 is pivotally connected between and to the top corners of triangular shaped bell cranks 155 and 156 by appropriate means such as bolt 167. The bottom, rearward corners of bell cranks 155 and 156 are connected to the outside of side plates 153 and 154 by appropriate means such as bolt 168, as shown. The forward bottom corners of bell cranks 155 and 156 are pivotally connected to and on opposing sides of a flange 169 by appropriate means such as bolt 170, as shown. Flange 169 is rigidly connected with vertical link 151. An offset platform 171 is connected to the bottom of vertical link 151 and extends inwardly thereof. A gusset 172 is connected between vertical link 151 and offset platform 171 to provide additional support therebetween. A mounting flange 173 extends downwardly from offset platform 171 to provide connection with linkage assembly 147.

Figure 10:
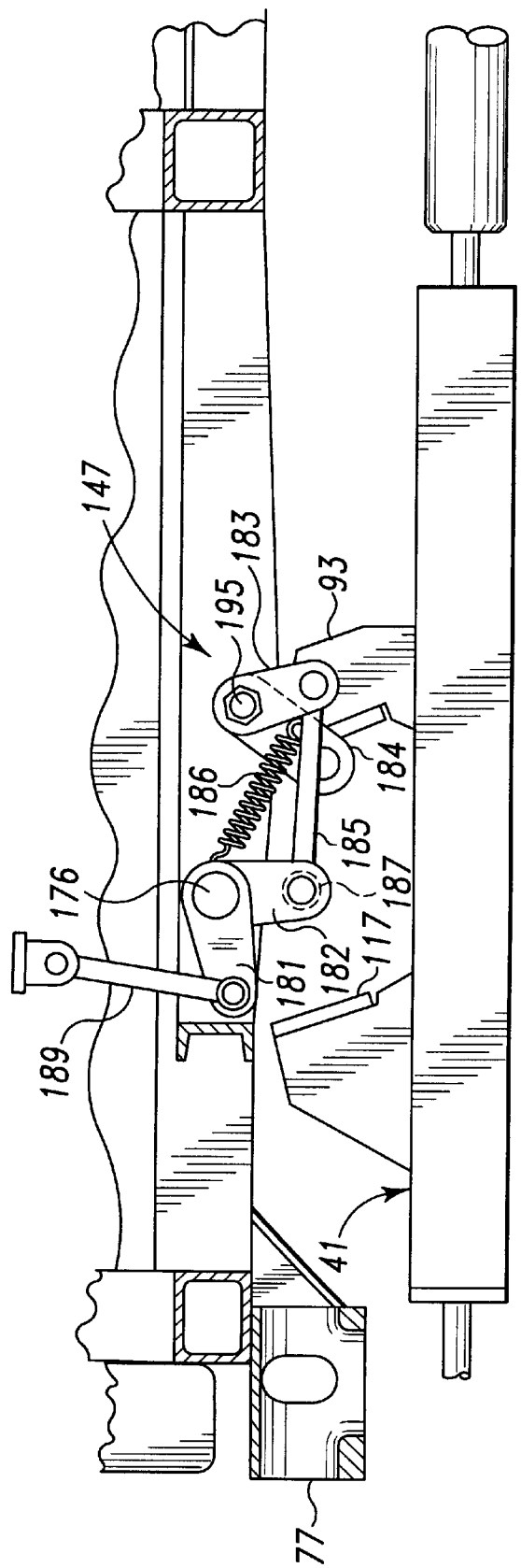
FIG. 10 is a side, elevational and partially cross-sectional view of the container 10 and actuator 41 of FIG. 9 showing linkage assembly 147 in the unlocked condition.
Figure 11:
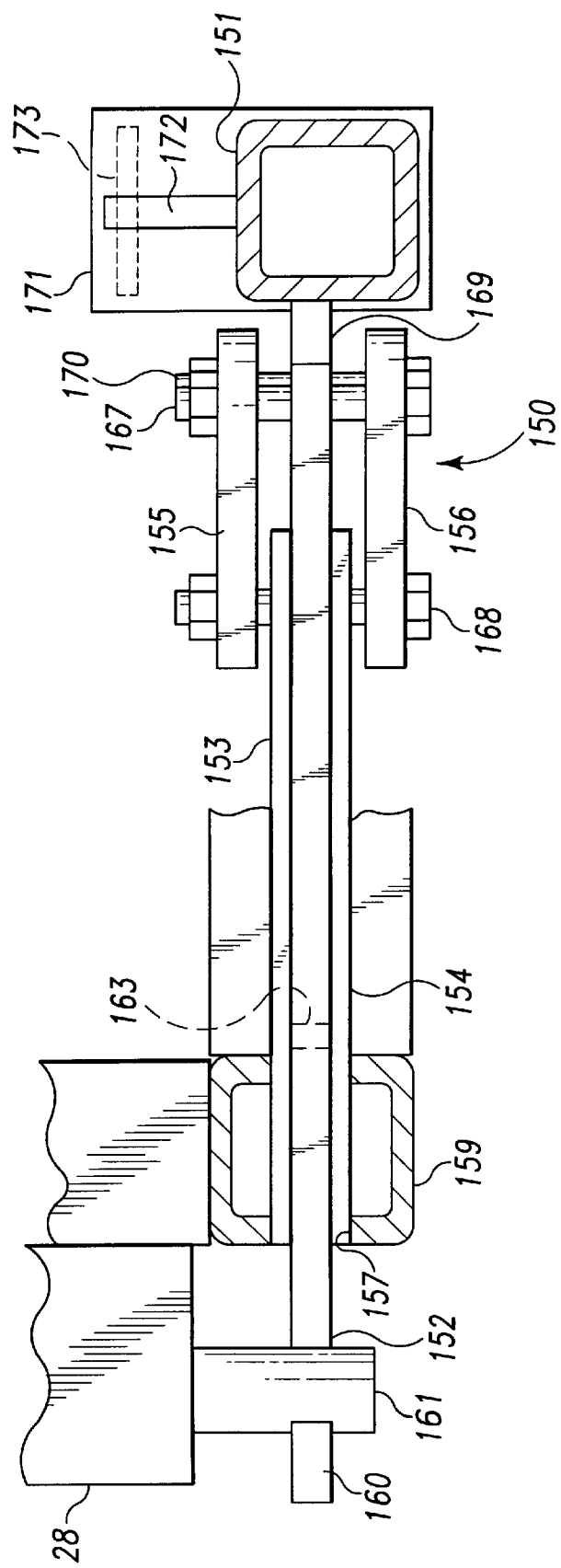
FIG. 11 is a top, partially cross-sectional view of latching mechanism 27 and a portion of container 10 of FIG. 9 taken along the lines 11—11 and viewed in the direction of the arrows.

Referring now to FIGS. 1, and 8–10, linkage assembly 147 comprises a number of pivotally mounted links and levers which translate the sliding action of hydraulic actuator assembly 41 to drive latch mechanisms 27 and which provide biasing means for urging latch mechanism 27 to remain in a locked condition once placed in a locked condition and in the unlocked position once placed in the unlocked condition. Generally, linkage assembly 147 includes mounting shafts 176 and 177–180, outer levers 181, intermediate lever pairs 182 and 183, inner levers 184, locking links 185, springs 186 and roller 187. Mounting shaft 176 extends between and is held for rotation by tubing members 136 and 137. Outer levers 181 are fixed to rotate with shaft 176 at the outer ends of shafts 176. A connecting link 189 is pivotally mounted to each of the outer levers 181, extending upwardly therefrom to a pivotal mounting to flange 173. Linkage assembly 147 is identical on either side of roller 187 and the following description will be directed to one side only. Further, FIGS. 9 and 10 show the various elements of linkage assembly 147 with linkage assembly mounting beams 145 and 146 removed for clarity.

Also fixedly mounted to rotate as a unit with shaft 176 and outer lever 181 is the pair of levers 182. One end of locking link 185 is pivotally mounted between and at the outboard ends of links 182 by a pin 190. The other end of locking link 185 is pivotally mounted between and at the outboard ends of links 183 by appropriate means such as a pica 191. The inboard ends of links 183 are fixedly mounted to separate but coaxial shafts 177 and 178 to rotate as a unit therewith, as shown. Shaft 177 is held for rotation about its axis by mounting beam 146. Shaft 178 is likewise held for rotation about its axis by mounting beam 145. Shaft 178 extends through beam 145 toward beam 144 where it is rigidly connected to the inboard end of inner lever 184 to rotate as a unit therewith. Roller 187 is mounted between and at the outboard ends of inner levers 184. Roller 187 is mounted to freely pivot about its axis, but other configurations are contemplated where roller 187 would comprise or include a wear ring or other structure which would enable it not to rotate, but to withstand rubbing action of an input as will be described herein. A spring clip 192 is fixed to locking link 185 at the forward end 194 thereof where locking link 185 connects with pin 191. Spring 186 extends in tension between spring clip 192 and an anchor ring 193, ring 193 loosely encircling mounting shaft 176.

In operation, and with linkage mechanism 147 and latch mechanism 27 in the locked condition shown in FIG. 9, hydraulic actuator assembly 41 is remotely activated by the vehicle operator which drives slide yoke 93 rearwardly (to the left in FIG. 9). Wear plate 115 contacts roller 187 and urges it rearwardly which rotates inner levers 184 which also rotates shafts 178 and intermediate levers 183 about the common axis 195 of shafts 178 and 177 (clockwise as shown in FIG. 9). Clockwise rotation of intermediate levers 183 drives end 194 and spring 186 downward through and past axis 195. Further rotation of lever 183 due to rearward movement of slide yoke 93 drives locking links 185 rearwardly which rotates intermediate levers 182, shaft 176 and outer levers 181 clockwise as shown in FIG. 9. This drives connecting link 189 and vertical link 151 upwardly which rotates bell cranks 156 about bolts 168 which translates latches 152 along follower pins 163, thereby moving latches 152 from the locked condition (shown in solid lines in FIG. 9) to the unlocked condition (shown in phantom in FIG. 9 and shown in FIG. 1). The resulting position of linkage assembly 147 and slide yoke 93 in the unlocked condition is shown in FIG. 10. The tension of springs 186 continues to urge locking links 185 rearwardly toward the unlocked condition and thereby biases latching mechanism 27 and linkage mechanisms 147 in the unlocked condition.

From the unlocked condition shown in FIGS. 1 and 10, activation by the vehicle operator of hydraulic actuator assembly 41 in the opposite direction retracts slide yoke 93 (to the right in FIG. 10) whereupon wear plate 117 contacts roller 187 and pivots levers 184 and 183 counterclockwise (FIG. 10) about axis 195 which translates locking link 185 which rotates levers 182 and 181 and shaft 176 counterclockwise (FIG. 10) which draws connecting link 189 and vertical link 151 downwardly which rotates bell cranks 155 and 156 about bolts 168 and pulls latches 152 along follower pins 163 into the locking condition shown in FIG. 9. Complete retraction of slide yoke 93 by cylinder 94 rotates intermediate links 183 enough to move the as of spring 186 above axis 195 at which point spring 186 continues to urge counterclockwise rotation of lever 183 about shafts 177 and 178, that is, to stay in the locked condition.

Upon complete retraction of slide yoke 93 by cylinder 94, the forward end 197 of compression spring 125 (FIGS. 5 and 6) engages with end plate 102 and spring 125 is compressed, its length being shortened by several inches. After the activating mechanism for cylinder 94 is released, venting cylinder 94, spring 127 will pull slide yoke 93 rearwardly several inches (shown in phantom at 198, FIG. 9). This will put slide yoke 93 into a neutral position wherein a container 10 may be unloaded and loaded and roller 187, during positionment of container 10 onto tilt frame 14, will not engage with wear plate 117 and inadvertently unlock door 28.

A hex nut 196 is provided at the outer ends of both shafts 177. This allows linkage assembly 147 to be manually locked or unlocked, if desired. Container 10 also is provided with a cast corner block 200 at each of its top four corners so that containers 10 may be stacked atop one another.

One intended use of the present invention is to provide transportation for containers 10 containing bulk materials such as coal by railway from the source to a transfer point where container 10 is moved from a railway car to a dump trailer of the type shown in FIG. 1. The semi-trailer rig may then be driven a shorter distance to its destination at which point the driver can remotely unlock the dump door 28 and dump the load without leaving the vehicle cab. Other embodiments are also contemplated wherein the present invention will enable the container 10 to be transported by two different semi-trailers.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for remotely locking and unlocking a door on a transportable container, the container sized and configured to ride atop a vehicle frame, comprising:

a container having an underside and a door hingedly connected thereto;

a vehicle frame sized and shaped to support said container thereon;

latch means mounted to the container and movable between locked and unlocked conditions for locking shut and unlocking the door relative to the container;

linkage means mounted to the underside of the container, connected with said latch means and being for actuating said latch means, said linkage means including a generally rod-shaped actuation roller connected to pivot about a first axis between first and second positions;

drive means mounted to the vehicle frame and being for engaging with and driving said linkage means, said drive means being operable remotely by a driver of the vehicle and including a yoke and a drive unit connected with the yoke to move the yoke along a generally linear path between third and fourth positions, and wherein the yoke includes forward and rearward wear plates spaced apart from each other to receive the roller therebetween and to engage with the roller, when said container is resting atop the vehicle, to pivot the roller between the first and second positions upon translation of the yoke, and wherein at least one of the forward and rearward wear plates forms an angle of approximately between 60 degrees and 80 degrees with the path of the yoke.

2. The apparatus in claim 1 wherein the locked condition includes said latch means locking the door closed relative the container and the unlocked condition includes said latch means releasing the door; said linkage means including biasing means for urging said latch means to remain in the locked condition once in the locked condition.

3. The apparatus of claim 2 wherein said linkage means includes a first lever having opposing inboard and outboard ends, said lever being mounted to the container at the inboard end to pivot about said axis, said apparatus further including a locking link having first and second ends, the first end being pivotally mounted at a first pin to the outboard end of the first lever away from said first axis and the second end being operationally connected to drive said latch means.

4. The apparatus of claim 3 wherein, when the container is positioned atop the vehicle, activation of said drive means pivots the first lever between first and second positions which causes the locking link to pass through said first axis.

5. The apparatus of claim 3 wherein, when the container is positioned atop the vehicle, activation of said drive means pivots the first lever between first and second positions, and wherein said locked condition includes the first lever being in the first position and the unlocked condition includes the first lever being in the second position.

6. The apparatus of claim 5 wherein 'said biasing means includes a biasing member operationally connected with said linkage means to urge the first lever to pivot toward the first position when the first lever is in the first position.

7. The apparatus of claim 5 wherein said biasing means includes a biasing member operationally connected with said linkage means to urge the first lever to pivot toward the second position when the first lever is in the second position.

8. The apparatus of claim 6 wherein the biasing member is a spring extending between the container and the locking link.

9. The apparatus of claim 8 wherein the spring is in tension.

10. The apparatus of claim 8 wherein the spring passes through said first axis when the first lever is pivoted between the first and second positions.

11. The apparatus of claim 8 wherein the locking link passes through said first axis when the first lever is pivoted between the first and second positions.

12. The apparatus of claim 1 wherein said drive means includes a guide channel mountable to the vehicle and sized and configured to receive the yoke for slidable reciprocation along the path.

13. The apparatus of claim 12 wherein the wear plates form an angle of 20 degrees plus or minus 10 degrees with said path.

14. The apparatus of claim 13 wherein the forward and rearward wear plates each have a top edge and a bottom edge, the top edges being rearward of the bottom edges.

15. The apparatus of claim 2 further including container holddown means for remotely locking and unlocking the container to the vehicle for transport and while said drive means is engageable with said linkage means.

16. The apparatus of claim 15 wherein the container has four bottom corners and includes a corner block at each bottom corner, each block defining at least one opening, and wherein said holddown means includes at least one plug assembly having a locking plug, and wherein said holddown means is connectable to the vehicle and operable to reciprocate between a locked and an unlocked condition, the locked condition of said assembly including the locking plug extending into the at least one opening of one of the corner blocks, and the unlocked condition on said assembly including the locking plug being withdrawn out of the at least one opening of said one of the corner blocks.

17. The apparatus of claim 16 wherein said holddown means further includes biasing means connected between said plug assembly and the vehicle and being for urging said plug assembly toward the locking condition of said plug assembly.

18. The apparatus of claim 17 wherein said holddown means further includes a container locator mounted to the vehicle, the locator being sized and configured to be received within another of said at least one openings to locate the container in a proper, predefined position atop the vehicle for proper operation of said holddown assembly and for proper alignment between said linkage means and said drive means.

19. The apparatus of claim 1 wherein the angle of least one of the forward and rearward wear plates with the path of the yoke is approximately 70 degrees.

20. The apparatus of claim 1 wherein the angle of both of the forward and rearward wear plates with the path of the yoke is approximately between 60 degrees and 80 degrees.

21. The apparatus of claim 20 wherein the angle of both of the forward and rearward wear plates with the path of the yoke is approximately 70 degrees.

22. The apparatus of claim 1 wherein said linkage means includes a shaft mounted to rotate about the first axis and being mechanically linked upon its rotation to move said latch means between locked and unlocked conditions, said linkage means further including at least one inner lever having first and second ends, the inner lever being connected at its first end to the shaft to pivot about the first axis, and wherein the roller is connected to extend substantially orthogonally from the second end of the at least one inner lever.

23. The apparatus of claim 22 wherein the roller has a substantilly round cross-section.

24. The apparatus of claim 23 wherein the wear plates each have generally flat roller engaging surfaces.

25. The apparatus of claim 24 wherein the roller has a vertical profile and the wear plates have a vertical profiles that are larger than the verticle profiles of the roller.

* * * * *